(12) United States Patent
Gorin et al.

(10) Patent No.: US 7,930,179 B1
(45) Date of Patent: *Apr. 19, 2011

(54) UNSUPERVISED SPEAKER SEGMENTATION OF MULTI-SPEAKER SPEECH DATA

(75) Inventors: Allen Louis Gorin, Berkeley Heights, NJ (US); Zhu Liu, Marlboro, NJ (US); Sarangarajan Parthasarathy, New Providence, NJ (US); Aaron Edward Rosenberg, Berkeley Heights, NJ (US)

(73) Assignee: AT&T Intellectual Property II, L.P., Atlanta, GA (US)

( * ) Notice: Subject to any disclaimer, the term of this patent is extended or adjusted under 35 U.S.C. 154(b) by 703 days.

This patent is subject to a terminal disclaimer.

(21) Appl. No.: 11/866,125

(22) Filed: Oct. 2, 2007

Related U.S. Application Data (62) Division of application No. 10/350,727, filed on Jan. 24, 2003, now Pat. No. 7,295,970.

(60) Provisional application No. 60/406,994, filed on Aug. 29, 2002.

(51) Int. Cl.
*G10L 17/00* (2006.01)

(52) U.S. Cl. .......................... 704/246; 704/245; 704/250

(58) Field of Classification Search .................. 704/246, 704/231, 233, 243, 244, 245, 249, 250
See application file for complete search history.

(56) References Cited

U.S. PATENT DOCUMENTS 5,598,507 A * 1/1997 Kimber et al. ................ 704/246

OTHER PUBLICATIONS

J-F. Bonastre et al, "A Speaker Tracking System Based on Speaker Turn Detection for NIST Evaluation," *Proc. ICASSP 2000, IEEE Int'l. Conf. on Acoustics, Speech and Signal Processing*, Istanbul, Turkey 2000, pp. 1177-1180.

K. Mori et al., "Speaker Change Detection and Speaker Clustering Using VQ Distortion for Broadcast News Speech Recognition," *Proc. ICASSP 2001, IEEE Int'l. Conf. on Acoustics, Speech and Signal Processing*, Salt Lake City, Utah 2001, pp. 413-416.

D. A. Reynolds et al., "Robust Text-independent Speaker Identification Using Gaussian Mixture Models," *IEEE Trans. on Speech and Audio Processing*, vol, 3, 1995, pp. 1339-1342.

M-H. Siu et al., "An Unsupervised, Sequential Learning Algorithm for the Segmentation of Speech Waveforms with Muitiple Speakers," *Proc. ICASSP 1992. IEEE Int'l. Conf. on Acoustics, Speech and Signal Processing*, San Francisco, California, vol. II, 1992, pp. 189-192.

M. Sugiyama et al., "Speech Segmentation and Clustering Based on Speaker Features," *Proc. ICASSP 1993. IEEE Int'l. Conf. on Acoustics, Speech and Signal Processing*, 1993, pp. 392-398.

L. Wilcox et al., "Segmentation of Speech Using Speaker Identification," *Proc. ICASSP 1994, IEEE Int'l. Conf. on Acoustics, Speech and Signal Processing*, Adelaide, Australia, 1994, pp. 161-164.

(Continued)

Primary Examiner — Huyen X. Vo (57) ABSTRACT

Systems and methods for unsupervised segmentation of multi-speaker speech or audio data by speaker. A front-end analysis is applied to input speech data to obtain feature vectors. The speech data is initially segmented and then clustered into groups of segments that correspond to different speakers. The clusters are iteratively modeled and resegmented to obtain stable speaker segmentations. The overlap between segmentation sets is checked to ensure successful speaker segmentation. Overlapping segments are combined and remodeled and resegmented. Optionally, the speech data is processed to produce a segmentation lattice to maximize the overall segmentation likelihood.

20 Claims, 7 Drawing Sheets

OTHER PUBLICATIONS

A.E. Rosenberg, et al., "Speaker Detection in Broadcast Speech Databases", Proc. of ICSLP98, 5$^{th}$ Intl. Conf. on Spoken Lang. Processing, Sydney, 1339-1342, 1998.

B. Zhou et al., "Unsupervised Audio Stream Segmentation and Clustering Via the Bayesian Information Criterion", Proc. of ICSLP 2000, 6$^{th}$ Intl. Conf. on Spoken Lang. Processing, Beijing, III, 714-717, 2000.

P. Delacourt et al., "Detection of Speaker Changes in an Audio Document", Proc. Eurospeech 99, 1195-1198, Budapest, 1999.

R. Dunn et al., "Approaches to Speaker Detection and Tracking in Conversational Speech", Digital Signal Processing, 10, 93-112, 2000.

J. Makhoul, et al., "Speech and Language Technologies for Audio Indexing and Retrieval", Proc. of the IEEE, 88, 1338-1352, Aug. 2000.

H. Gish et al., "Segregation of Speakers for Speech Recognition and Speaker Identification", Proc. ICASSP 91. IEEE Intl. Conf. on Acoustics, Speech and Signal Processing, Toronto, 873-876, 1991.

J-L. Gauvain et al., "Partitioning and Transcription of Broadcast News Data", Proc. of ICSLP98, 5$^{th}$ Intl. Conf. on Spoken Lang. Processing, Sydney, 1335-1338, 1998.

I. Magrin-Chagnoileau et al., "Detection of Target Speakers in Audio Databases", Proc. ICASSP 99. IEEE Intl. Conf. on Acoustics, Speech and Signal Processing, Phoenix, 821-824, 1999.

* cited by examiner

UNSUPERVISED SPEAKER SEGMENTATION OF MULTI-SPEAKER SPEECH DATA

RELATED APPLICATIONS

The present application is a divisional of U.S. patent application Ser. No. 10/350,727, filed Jan. 24, 2003, which claims the benefit of U.S. Provisional Application No. 60/406,994, filed Aug. 29, 2002, the contents of which are incorporated herein by reference in their entirety.

BACKGROUND OF THE INVENTION

1. The Field of the Invention

The present invention relates to systems and methods for segmenting multi-speaker speech or audio data by speaker. More particularly, the present invention relates to systems and methods for unsupervised segmentation of telephone conversations by speaker.

2. Background and Relevant Art

The segmentation of multi-speaker speech or audio data by speaker has received considerable attention in recent years. One goal of speaker segmentation is to identify the segments of the speech data that correspond to the speakers. Speaker segmentation can be useful in automatic speech recognition (ASR) systems for a variety of different reasons. For example, speaker segmentation is used in training natural speech automatic call classification systems.

In call classification systems, the multi-speaker speech data usually includes a telephone conversation between two different speakers and speaker segmentation is used to identify the segments of the speech data that correspond to each speaker. For example, when a customer calls a customer representative at a call center, speaker segmentation can be used in conjunction with the ASR system to identify the customer's request from the speech data. In other words, speaker segmentation identifies the segments that correspond to the customer and the ASR system can recognize the customer's request that is found in the identified segments that correspond to the customer. Alternatively, the segments can be used for training purposes to find customer requests in conversations or to adapt ASR models and language understanding models in multi-speaker speech.

Speaker segmentation of multi-speaker speech data can be either supervised or unsupervised. In supervised speaker segmentation, pre-existing labeled models are used to segment the multi-speaker speech data. Unsupervised segmentation of multi-speaker speech data is considerably more difficult than supervised segmentation of multi-speaker speech data because the multi-speaker speech data is segmented without the benefit of pre-existing labeled models or prior information. As a result, unsupervised segmentation of multi-speaker speech data typically performs more poorly than supervised segmentation of multi-speaker speech data.

In addition to not having models or other information to help segment the speech data by speaker, unsupervised segmentation of speech data faces several additional obstacles that complicate the task of separating the segments of one speaker from the segments of another speaker. For example, multi-speaker speech data typically includes several short segments. Short segments are difficult to analyze because of the inherent instability of short analysis windows. In addition, more than one speaker may be talking at the same time in multi-speaker speech data and the segments may be contaminated with the speech of another speaker.

BRIEF SUMMARY OF THE INVENTION

These above-referenced limitations are addressed by the present invention which relates to systems and methods for segmenting multi-speaker speech data or audio data by speaker. The present invention further relates to the unsupervised segmentation of telephone conversations between two different speakers. Unsupervised segmentation of multi-speaker speech data has applications in, for example, training call classification systems, indexing archived recorded broadcast news programs by speaker to facilitate browsing and retrieval of desired portions, tagging speaker-specific portions of data to be used for adapting speech models in order to improve the quality of ASR transcriptions, tracking speaker-specific segments in telephone conversations to aid in surveillance applications, and the like.

The segmentation of multi-speaker speech data begins by obtaining short-term spectral energy measurements during a front-end analysis of the speech data. For example, spectral energy measurements such as cepstral and energy coefficients are often obtained from a sample speech input that includes multi-speaker speech data. After the front-end analysis is performed, a speaker segmentation process is performed on the resulting speech data. The speaker segmentation process begins with an initial segmentation and clustering of segments included in the input speech data. During the clustering procedure, groups of segments or clusters are associated with different speakers.

Then, the speaker segmentation process continues with modeling and resegmentation of the speech data. Modeling and resegmentation are performed iteratively on each cluster in order to obtain stable segmentations. The resulting segments in the stable segmentations are then compared to determine the amount of overlap. In a two-speaker conversation, the segmentation is considered successful if there are two segmentations or clusters and the overlap between them is below a specified level.

The final segmentation is obtained by comparing the final detection scores or target model scores of the segmentations. Segment boundaries are hypothesized at times throughout the sample speech data where the difference between the detection scores crosses zero. A hypothesized segment is accepted if it does not cross a significant silence gap and has an acceptable duration. Segment labels are associated with the greater detection score within the segment boundaries.

Alternatively, after the segmentations are obtained, an optimum segmentation is created using a segmentation lattice. In the optimum segmentation, a best path through the segmentation lattice can be obtained such that the overall segmentation likelihood is maximized.

Additional features and advantages of the invention will be set forth in the description which follows and in part will be obvious from the description, or may be learned by the practice of the invention. The features and advantages of the invention may be realized and obtained by means of the instruments and combinations particularly pointed out in the appended claims. These and other features of the present invention will become more fully apparent from the following description and appended claims, or may be learned by the practice of the invention as set forth hereinafter.

BRIEF DESCRIPTION OF THE DRAWINGS

To further clarify the above and other advantages and features of the present invention, a more particular description of the invention will be rendered by reference to specific embodiments thereof which are illustrated in the appended drawings. It is appreciated that these drawings depict only typical embodiments of the invention and are therefore not to be considered limiting of its scope. The invention will be described and explained with additional specificity and detail through the use of the accompanying drawings in which.

DETAILED DESCRIPTION OF THE PREFERRED EMBODIMENTS

The present invention relates to unsupervised segmentation of multi-speaker speech or audio data. The unsupervised segmentation of multi-speaker audio data can be applied, for example, to tagging customer requests for training call classification systems, indexing archived recorded broadcast news programs by speaker to facilitate browsing and retrieval of desired portions, tagging speaker-specific portions of data to be used for adapting speech models in order to improve the quality of automatic speech recognition (ASR) transcriptions, tracking speaker-specific segments in telephone conversations to aid in surveillance applications, segmenting telephone conversations between two speakers, and the like or any combination thereof.

Unsupervised segmentation of multi-speaker speech data, in one embodiment, includes detecting segments of speech data from the same speakers in the multi-speaker audio or speech data. One advantage of the present invention is that prior models of the speakers are not required. In other words, the process of detecting segments from the same speakers in multi-speaker speech data is unsupervised.

The ability to detect segments from the same speakers helps automate, for example, the process of training call classification systems. Unsupervised speaker segmentation can be used to locate the speaker segment in a customer care dialogue in which the customer states his or her request. The present invention may also be used to select speech data for training an automatic speech recognition system or to collect homogeneous speech segments to adapt speech recognition systems.

For example, call centers often receive calls from customers who are making a customer care request for information or service. In order to train an automated system, it is necessary to find the customer segment or segments in which the request is stated. After the segment(s) are found, they can be labeled and added to the data in a training database. Often, these segment(s) are usually the longest segment(s) spoken by the customer and typically occur early in the conversation between the customer and the customer care representative. Finding the segments of interest in a telephone conversation is an example of unsupervised speaker segmentation.

One embodiment of the present invention performs the unsupervised segmentation by speaker of telephone conversations between two speakers and produces a set of segments for each speaker. In some embodiments, the segmentation stage is followed by a "tracking" stage where each set of segments is compared with a set of known target speakers to detect, label, and locate their presence in the speech data.

Figure 1:
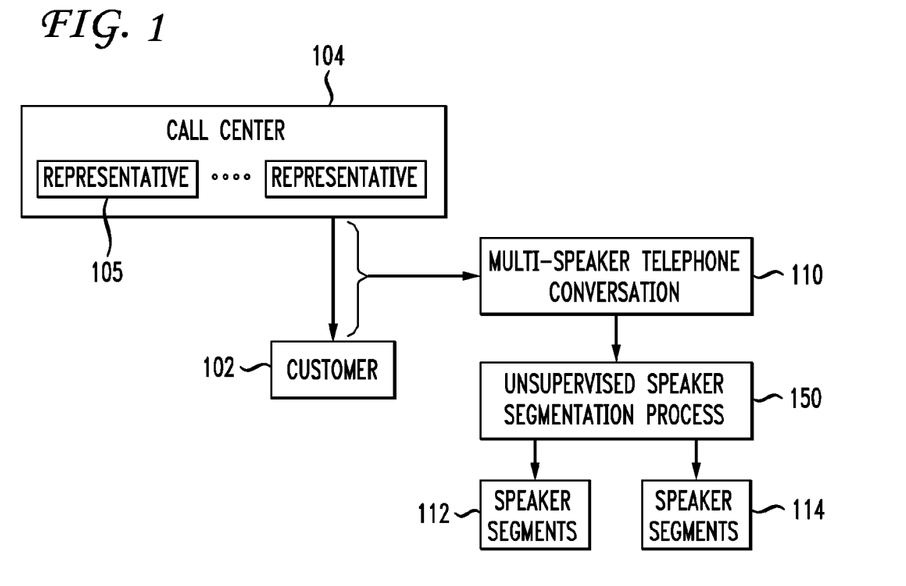
FIG. 1 illustrates an example of segmenting a telephone conversation between a customer and a call center by speaker.

FIG. 1 illustrates an exemplary environment for implementing the present invention. In FIG. 1, a customer 102 places a call to a call center 104 and is subsequently connected with a representative 105. A multi-speaker telephone conversation 110 thus occurs between the customer 102 and a customer representative 105 at the call center 104. For simplicity, this example assumes that the customer 102 only speaks with a single representative at the call center 104. The multi-speaker telephone conversation 110 thus contains speech data for two different speakers.

Often the multi-speaker telephone conversation 110 is recorded and stored in a database. The unsupervised speaker segmentation process 150 segments the multi-speaker telephone conversation 110 into a set of segments for each speaker. In this example, the speaker segment(s) 112 correspond to the set of segments for the representative 105 and the speaker segment(s) 114 correspond to the set of segments for the customer 102.

In one embodiment, speaker segmentation is performed iteratively. First, acoustic change detection and segment clustering are performed. Then, a Gaussian Mixture Model (GMM) is constructed for the pooled data associated with each segment cluster. The input speech sample is compared with each such model to output a detection score as a function of time which is used to obtain a new segmentation estimate. This process is iterated until stable segmentations are obtained.

The motivation for adopting an iterative approach to speaker segmentation is that the initial segmentation is generally incomplete and imprecise. The coverage of the initial segmentation usually does not segment the speech data adequately and the iterative approach refines and fills out the coverage to better segment the speech data by speaker. The incomplete and imprecise nature of the initial segmentation is attributable, in part, to the short duration of a large number of the speaker segments in telephone conversations. In order to resolve short segments, the data window used to detect acoustic changes and mark the segments must also be short to avoid including more than one speaker change in the window. However, the generalized likelihood ratio (GLR) computation used for acoustic change detection becomes variable and unstable for short duration windows. To compensate for this instability, the initial segmentations are generally under-estimates. The iterative process following the initial segmentation and clustering refines and fills out the speaker segmentations.

Initial Segmentation

Figure 2:
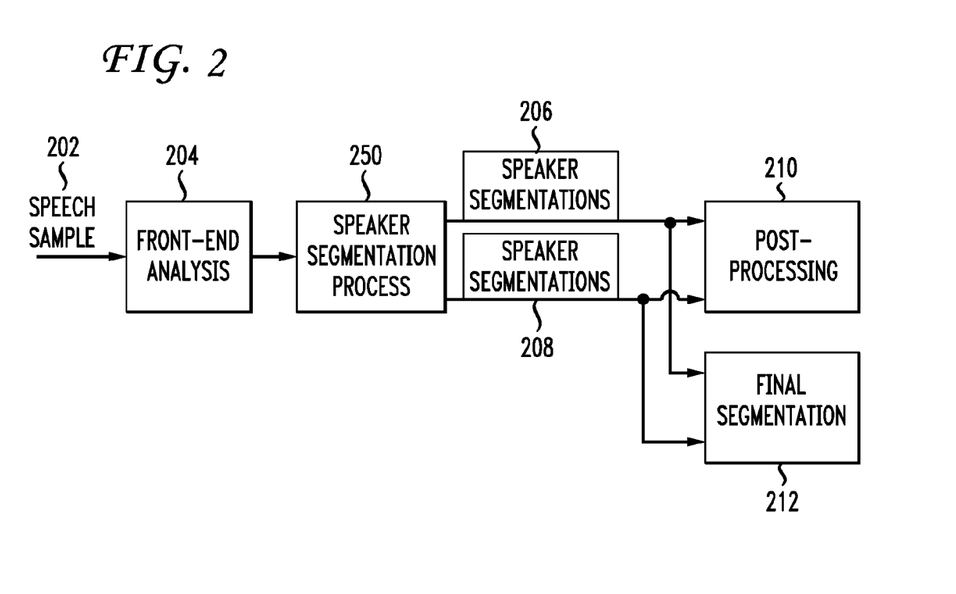
FIG. 2 is a block diagram of one embodiment of unsupervised multi-speaker segmentation of speech data.

An overall block diagram of the unsupervised speaker segmentation process is illustrated in FIG. 2. The multi-speaker speech sample 202, which is a conversation between two speakers in this example, is input to the front-end analysis 204. The front-end analysis 204 is followed by the speaker segmentation process 250. The output of the speaker segmentation process 250 is two distinct segmentations, speaker segmentation 206 and speaker segmentation 208, which correspond to two speakers. If the input speech sample 202 included more than two speakers, then the speaker segmentation process 250 would generate additional speaker segmentations.

Next, a final segmentation is obtained by comparing the detection or target model scores of the distinct speaker segmentations 206 and 208. Segment boundaries are hypothesized throughout the speech sample 202 when the difference between the detection score crosses zero. The hypothesized segments are accepted if they do not cross a significant silence gap and have a minimum acceptable duration. Segment labels are associated with the greater detection score within the segment boundaries. Alternatively, during post-processing 210, the speaker segmentations 206 and 208 are used to create a segmentation lattice from which an optimum segmentation is derived. A best path in the segmentation lattice can be obtained such that the overall segmentation likelihood is maximized. Any residual overlap between the two component segmentations is eliminated during post-processing 210.

In one embodiment of the front-end analysis 204, each speech sample is digitized at an 8 kHz rate. Twelfth-order cepstral coefficients are calculated every 10 ms (80 samples) over 20 ms (160 sample) windows by applying a discrete cosine transform (DCT) to the sample speech data in the window. Real-time energy normalization is applied with a 300 ms look-ahead window. The cepstral coefficients are augmented by twelfth-order delta-plus delta-delta-cepstral coefficients plus energy, delta-energy, and delta-delta-energy coefficients. Frames with energy falling below a specified level below peak energy are eliminated. After the speech sample 202 is processed by the front-end analysis 204, the speaker segmentation process 250 is applied to the speech sample 202 using the information from the front-end analysis 204.

Figure 3:
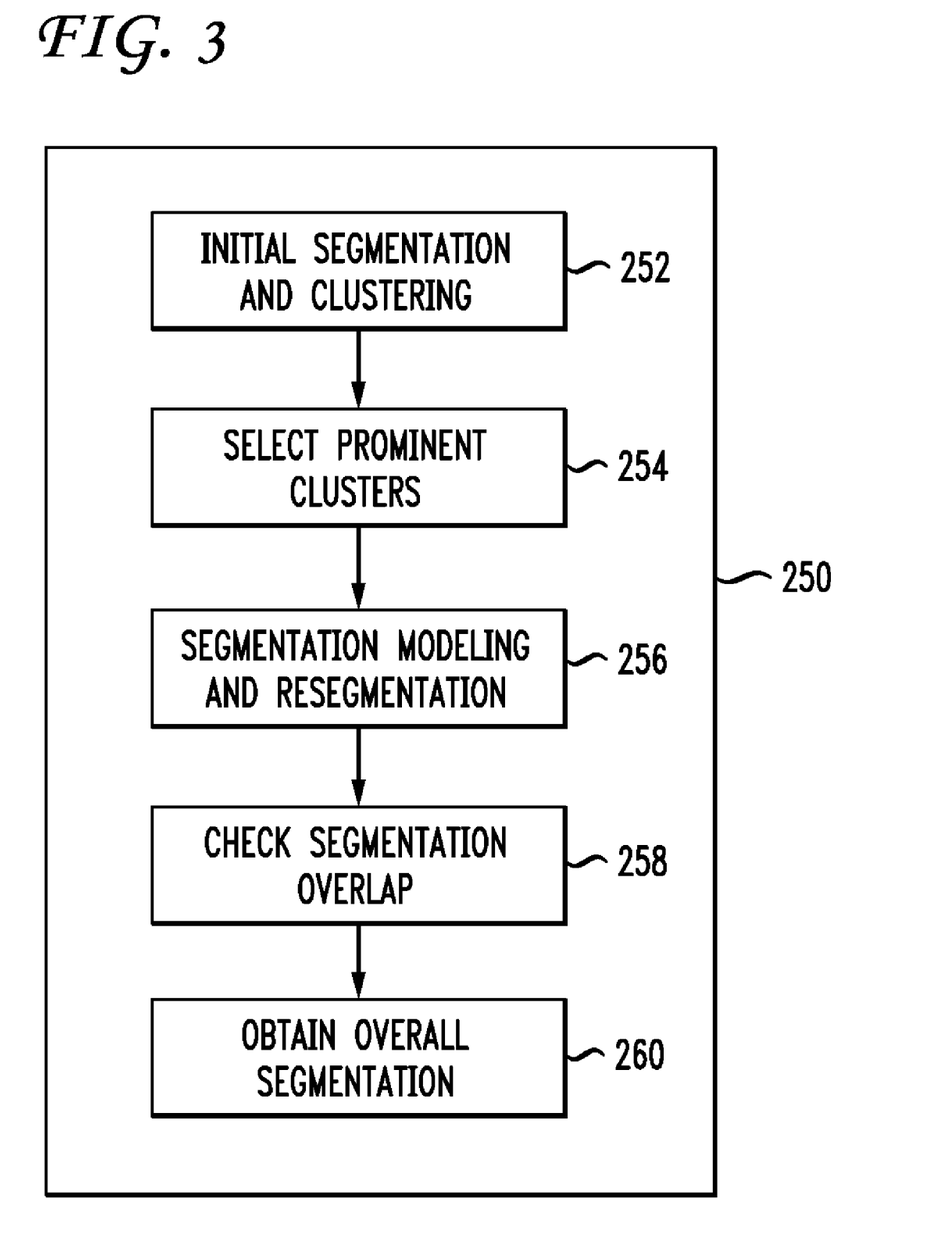
FIG. 3 is a block diagram of one embodiment of an unsupervised speaker segmentation process.

FIG. 3 illustrates an exemplary embodiment of the speaker segmentation process 250. Following the front-end analysis 204, the speaker segmentation process 250 begins with an initial segmentation and clustering of segments (252). A Generalized Likelihood Ratio (GLR) formulation is used to carry out this initial segmentation. For example, assume that there are 2 segments, $X_1$ and $X_2$ represented by feature vectors $X_1 = \{x_{11}, x_{12}, \ldots, X_{1N_1}\}$, and $X_2 = \{x_{21}, x_{22}, \ldots, x_{2N_2}\}$ each segment containing speech generated by one speaker. Let the null hypothesis $H_0$ be that the speakers in the two segments are the same speaker, and the alternative hypothesis, $H_1$, be that the speakers in the two segments are different speakers. Let $L(X_1; \lambda_1)$ and $L(X_2; \lambda_2)$ be the likelihoods of $X_1$ and $X_2$ where $\lambda_1$ and $\lambda_2$ represent model parameters which maximize the likelihoods. Similarly let $X = X_1 \cup X_2$ be the union of $X_1$ and $X_2$ and $L(X; \lambda_{1+2})$ be the maximum likelihood estimate for X. Then the likelihood ratio (LR) is $$LR = \frac{L(X; \lambda_{1+2})}{L(X_1; \lambda_1) L(X_2; \lambda_2)}. \quad (1)$$

In this example, $X_1$ and $X_2$ are adjacent equal-duration intervals in a window interval X and the model parameters $\lambda_1$, $\lambda_2$, and $\lambda_{1+2}$ are GMMs derived from a GMM representing the whole data sample by adapting the component weights in the respective intervals, holding the means and variances fixed. To determine the location of boundaries between speaker segments, the GLR function is calculated over successive overlapping windows throughout the data sample. When the window is contained within a speaker segment, the value of LR should be close to 1. If the window interval X is centered over a boundary between speaker segments, then the LR function should exhibit a distinct dip.

For the GLR to perform well, the window should be long enough to obtain stable statistics yet short enough to avoid containing more than one speaker segment change. In this example that includes a telephone conversation, the telephone conversation is likely to contain many short, one-word response segments. The window duration is shortened to 1.6 seconds and the window is shifted every 0.2 seconds to resolve many such segments, but this duration generates a significant amount of variability in the GLR function as a function of time due to the variation in window content.

Dips in the GLR computation as a function of time are not generally distinctly discernible. Therefore, in addition to estimating speaker segments by detecting GLR dips, regions in which the GLR functions remain above a specified threshold for at least some minimum duration are selected. Such regions are likely to be associated with a single speaker (or channel) but generally do not include an entire speaker segment. Pauses are possible, but not reliable, indicators of speaker changes. Pause locations are combined with the segment estimates obtained from the GLR function, in one embodiment, by not allowing a segment to overlap a significant pause. In alternative embodiment, Bayes Information Criterion (BIC) is used to detect speaker changes.

Figure 5:
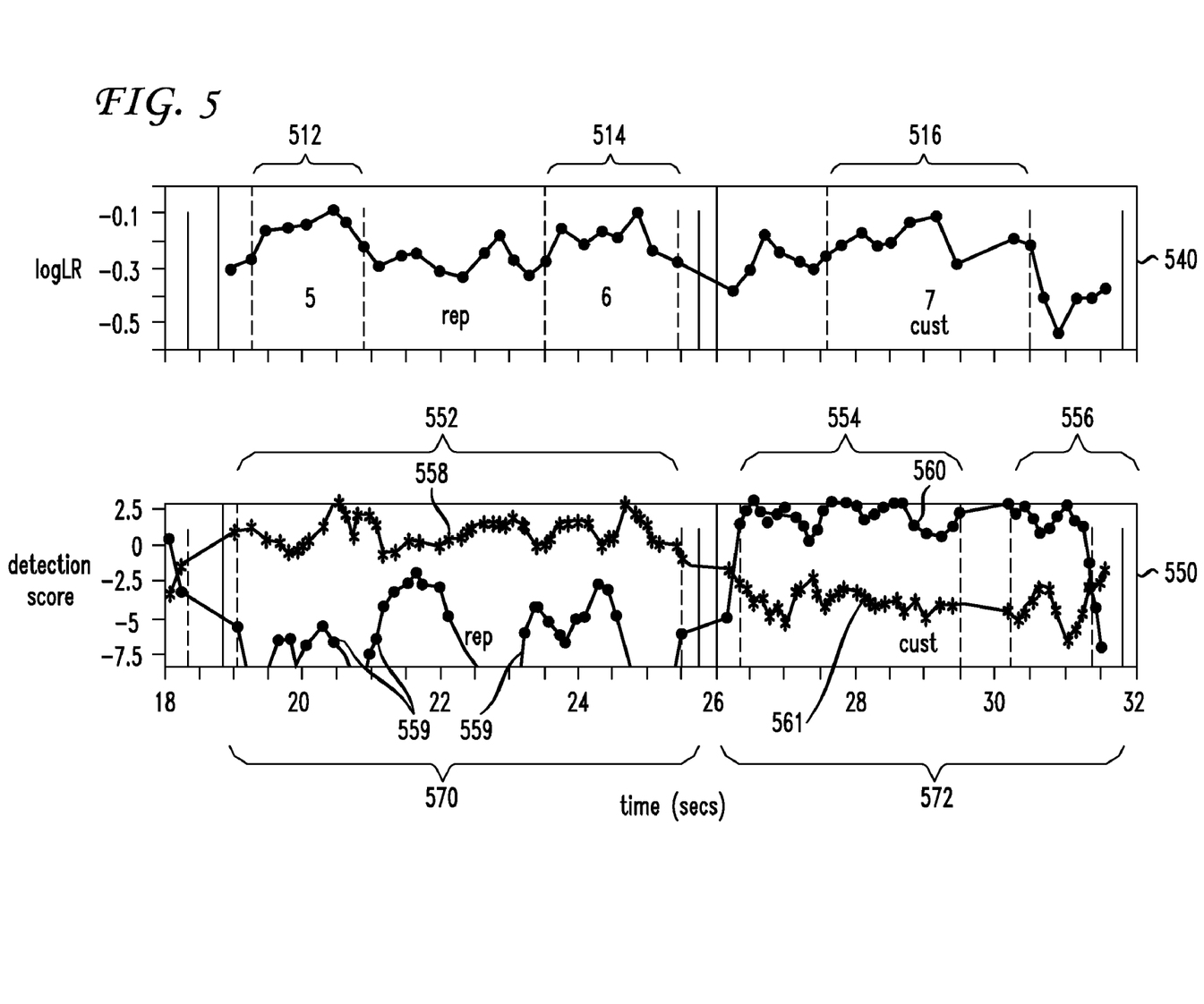
FIG. 5 is a fragment of a speech sample showing the likelihood ratio score used to obtain initial segments and the final detection scores for each target and the segmentation based on the difference between these scores.

A plot of the log of LR as a function of time for a fragment of a conversation sample is shown as plot 540 in FIG. 5. Estimated segments are marked by dashed vertical lines. The plot 540 illustrates a sample showing the likelihood ratio score used to obtain initial segments. The likelihood ratio score illustrated in the plot 540 is typically associated with the initial segmentation of the speech sample. The plot 550, discussed later, represents detection scores for speaker segments in the conversation and the detection scores are distinct from the likelihood ratio score.

In FIG. 5, the segments 512, 514, and 516 are initially estimated segments using the generalized likelihood ratio formulation in this instance and the segments 512, 514, and 516 correspond to the estimated segments produced by an initial segmentation of the speech data or sample. The estimated segments 512, 514, and 516 are usually unlabeled and are often under-estimated. In addition, the segments 512, 514, and 516 may not correspond to a particular speaker. Further, the estimated segments obtained during the initial segmentation do not typically include entire speaker segments. This helps ensure, in one embodiment, that each of the initial estimated segments includes a single speaker. In the plot 540 of FIG. 5, the solid vertical lines mark the actual segments while the dashed lines mark the initially estimated segments. Long solid or dashed lines indicate a segment start and short solid or dashed lines indicate a segment end.

The estimated segments are labeled, in one example, by assuming that the first speaker in the conversation is the representative and that the first estimated segment corresponds to the representative. All segments that match the first segment are labeled like the first segment. The remaining segments, in a two speaker conversation, are labeled as the customer.

Clustering

The segments obtained by scanning the input speech sample with the windowed GLR function, as described above, are clustered to associate groups of segments with different speakers. In one example, an agglomerative hierarchical clustering procedure is used to associate groups of segments with different speakers. The clustering procedure is used to obtain an initial grouping of segments.

Models are created for the pooled segments in each cluster and the input speech sample is rescanned with these models to re-segment the speech data. The process continues iteratively with the ultimate goal of providing a segment group for each speaker. In this example of a telephone conversation between a customer and a representative, the goal is to provide two groups of segments, one for the customer and the other for the representative.

Usually, a speaker label can be applied to each group only when some additional a priori information is provided. In this case, however, the first segment in the conversation is usually a greeting spoken by the representative. Thus all segments grouped with that first segment should be labeled as spoken by the representative.

The input to the clustering procedure is a table of pairwise distances between each segment and every other segment. The following procedure is used to generate such a table. Each segment is modeled by a low-order (typically 2- or 4-component) GMM. The likelihood of the i-th segment $s_i$ for the model of the j-th segment, $\lambda_j$, is given by $$p_{ij} = p(s_i/\lambda_j). \quad (2)$$

The distance between segments i and j is given by $$d_{ij} = -\log \frac{p_{ij} p_{ji}}{p_{ii} p_{jj}}, \quad (3)$$

such that $d_{ij} = d_{ji}$ and $d_{ii} = 0$.

One clustering procedure used in the present invention is an agglomerative clustering procedure. The clustering procedure begins with each segment in a group of its own. At each iteration, the clustering procedure merges two groups to form a new group such that the merger produces the smallest increase in distance. The "compact" criterion is used for group distance in which the distance between two groups is defined as the largest distance between any two members of each group. It is understood that other distance measurements and clustering criteria can be used for the clustering procedure.

Figure 4:
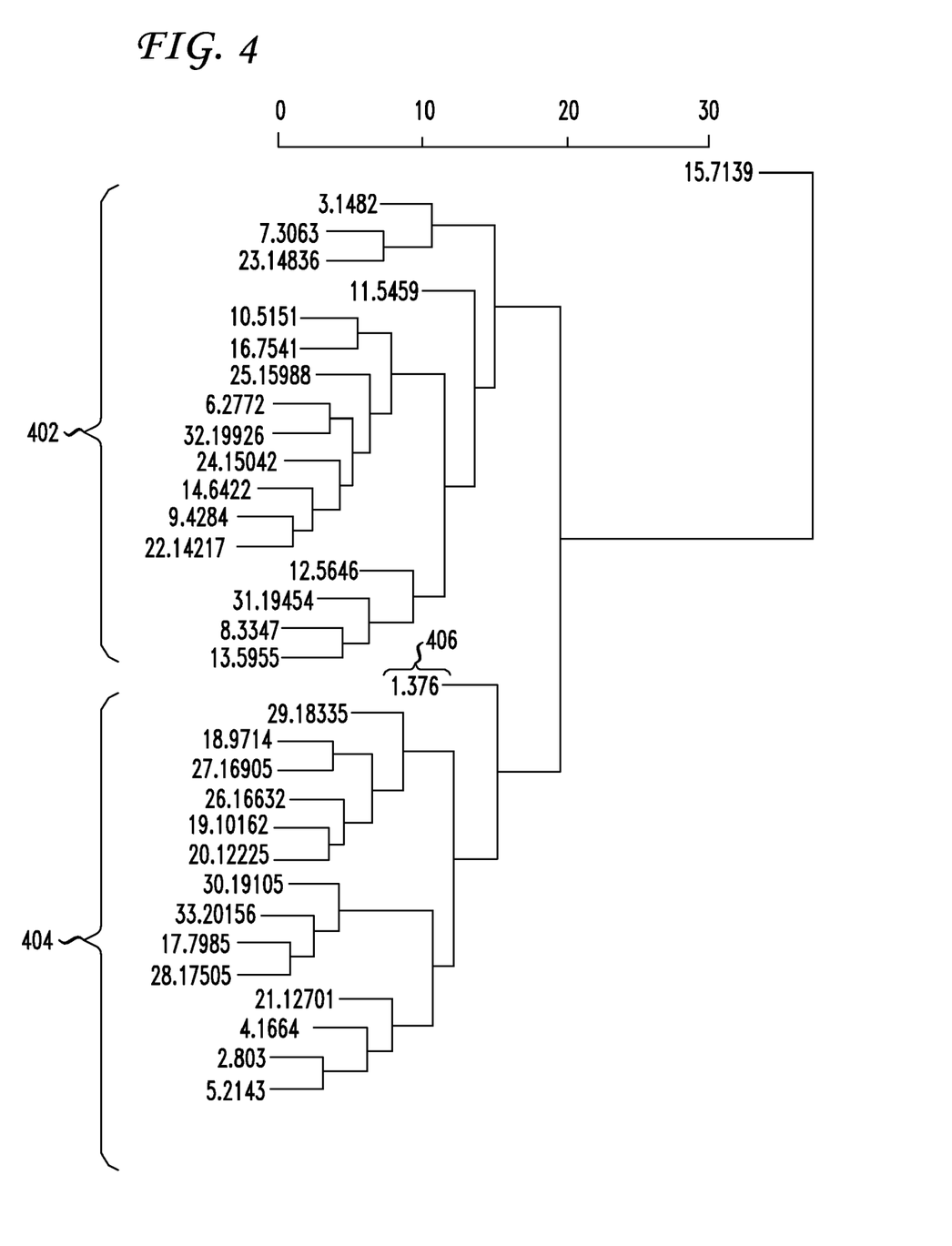
FIG. 4 illustrates an example of clustered speech segments.

The clustering procedure continues until all segments are merged into one group and the output is a binary classification tree whose nodes indicate segment groupings and whose levels indicate the merging distances. An example is shown in FIG. 4. FIG. 4 illustrates an example of an agglomerative clustering procedure that results in a group of segments or cluster 402 and a second group of segments or cluster 404. The clustering procedure concludes by selecting the most prominent clusters, which would be clusters 402 and 404 in this case. Each cluster 402 and 404 can be associated with a single speaker in this example.

In FIG. 4, each leaf corresponds to a segment of the speech data and is included in a cluster. For example, the leaf 406 is in the cluster 404. Each leaf is labeled, in this embodiment, using an order and location in the form <segn>.<beg>, where segn is the segment number and beg is the start location of the segment in centiseconds. Leaf 406 is labeled 1.376. The "1" corresponds to the order in which the segment occurs in the speech data and the "376" represents a location in the speech data.

Clustering is an empirical process which selects at least two non-intersecting clusters at the lowest merge levels such that the clusters contain at least a specified number of segments. In one embodiment, this minimum is set at ⅓ the total number of segments. However, the minimum can be adjusted downward to force at least two selected clusters. For a telephone conversation between two different speakers, the clustering procedure preferably outputs two prominent clusters corresponding to the two speakers in the conversation. If a telephone conversation between two different speakers results in more than two clusters, then a check is performed to determine if the segments in one cluster overlap with the segments of the other clusters. If the segments overlap, the overlapped groups of segments are pooled and a modeling and resegmentation/detection process (256 of FIG. 3) described below is restarted.

Segmentation Modeling and Detection

After the prominent clusters are selected (254) as described above, the speaker segmentation process illustrated in FIG. 3 continues with segmentation modeling and resegmentation 256. The data or segments in each cluster selected by the clustering procedure is pooled and a GMM is constructed to represent each cluster or group of segments. The input speech sample is scanned to calculate a frame-by-frame likelihood ratio detection score for the cluster model compared with a background model representing the whole sample. Both models are typically 64-component GMMs. A detection routine estimates the beginnings and ends of segments by subjecting the sequence of normalized scores to threshold tests.

In this example, the segmentation modeling and resegmentation 256 is iterated three times in order to obtain stable segmentations. The segmentations are stable when the difference between segmentations from one iteration to the next iteration is below a specified threshold. Likelihood ratio detection scores for two segmentation models created after three iterations are shown the plot 550 of FIG. 5. The detection scores in the plot 550 are therefore different than the likelihood ratio score obtained after an initial segmentation and illustrated in the plot 540.

The estimated segments in the plot 550 are indicated by the dashed lines. The estimated segments 552, 554, and 556 are generated after clustering and hypothesized segmentation. In contrast, the estimated segments 512, 514, and 516 correspond to an initial segmentation and are unlabeled and generally underestimated. As illustrated in the plot 550 of FIG. 5, one model represents the representative (rep) while the other represents the customer (cust).

The actual segment 570 illustrates a detection score 559 for the customer and a detection score 558 for the representative. This segment 570 is labeled for the representative as the detection score 558 is greater than the detection score 559. Similarly, in the actual segment 572, the detection score 560 of the customer is higher than the detection score 561 of the representative and the segment 572 is labeled accordingly as the customer. The segmentation is based on the difference between the detection scores of the representative and the detection scores of the customer. As previously mentioned, a speaker change is typically detected when a difference between detection scores crosses zero.

Checking Segmentation Overlap

The speaker segmentation process 250 illustrated in FIG. 3 continues by checking segmentation overlap (258). The final segmentations associated with each initial cluster are compared with each other to determine the amount of overlap. If there are two segmentations and the overlap between them falls below a particular threshold, the speaker segmentation process 250 is considered successful and each segmentation is considered to be associated with one of the speakers in the conversation. If the segmentations overlap significantly, the speaker segmentation process is considered to have failed.

Failure of the speaker segmentation process implies that the segments in the initial segmentations were excessively contaminated by the presence of data from other speakers and that the iterative modeling and resegmentation or detection process (256) could not overcome the original contamination. In one embodiment, if there are more than two segmentations and there is no overlap among the segmentations, the process is also considered to have failed. However, this outcome may indicate that there are more than two speakers in the conversation. If, however, one or more of the final segmentations overlaps with another, the overlapped segments are pooled and the modeling and resegmentation/detection process (256) is restarted. The outcome is then checked anew for overlapping segmentations (258) and continues until two distinct segmentations are obtained.

After the distinct speaker segmentations are obtained, a final segmentation is performed by comparing the target model scores or the detection scores between the speaker segmentations. Segment boundaries are hypothesized at times throughout the speech sample where the difference between the two target detection scores crosses zero. A segment that is hypothesized in this manner is accepted if it does not cross a significant silence gap and has a minimum acceptable duration. Segment labels are associated with the greater target or detection score within the segment boundaries.

Post-processing 210, shown in FIG. 2, may be invoked to combine the final segmentations into an overall optimum segmentation instead of performing a final segmentation. In post-processing 210, a segmentation lattice is created that allows segment changes to occur at any of the segment boundaries from both segmentations. The best path through this lattice, a sequence of non-overlapping segments, is obtained such that the overall segmentation likelihood is maximized.

Experimental Evaluation

In one example of speaker segmentation, an experimental database having 6-minute recordings of telephone conversations between long distance customers and customer care representatives (representative) was used. The calls are initiated by the customer, for example, to make some sort of billing or service inquiry with the representative. Typically, the recordings include approximately three minutes of on-hold music followed by two or three minutes of actual conversation. Each recording is truncated at six minutes even if the conversation is not completed. For the purposes of this example, twelve recordings have been selected at random from the experimental database. The customer-representative conversation has been extracted from each recording and hand labeled.

Figure 6:
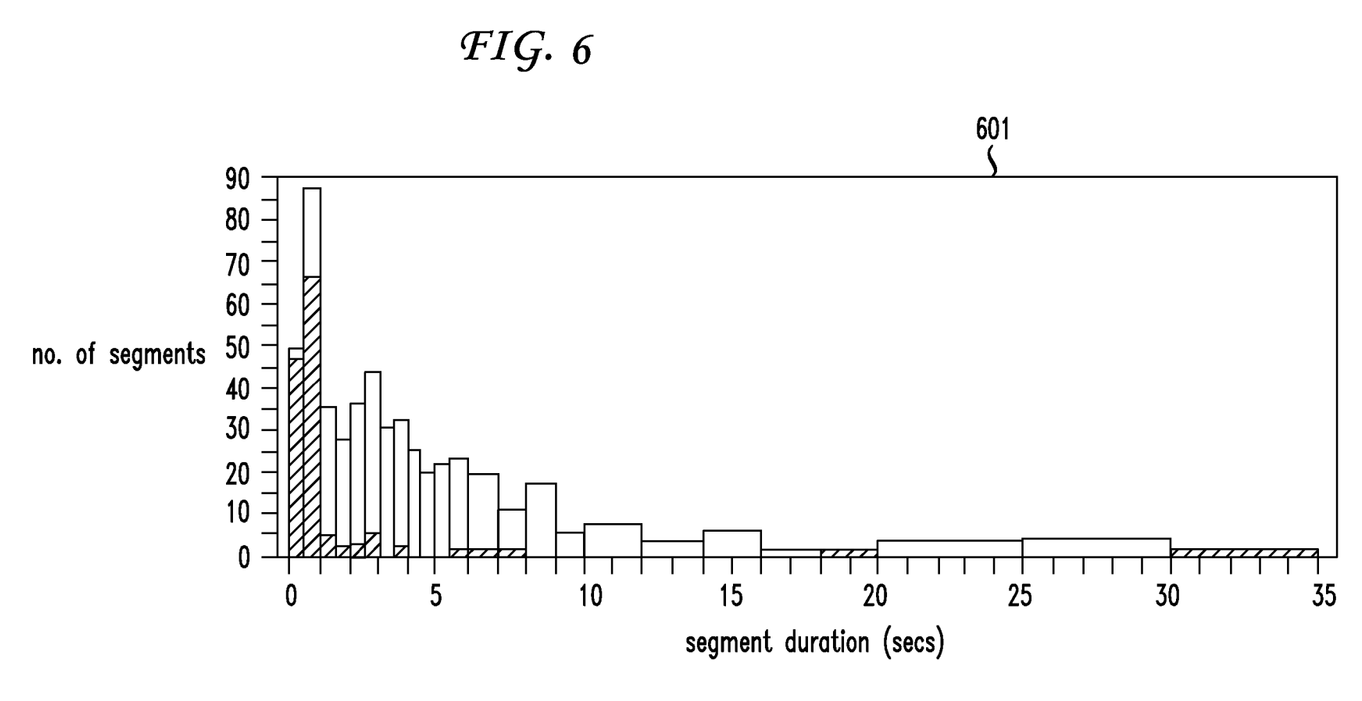
FIG. 6 is a histogram of speaker segment durations in speech data that includes twelve conversations of speech data where each conversation includes approximately three minutes of conversation.

A histogram 601 of segment durations for the labeled segments pooled from all twelve conversations is shown in FIG. 6. FIG. 6 illustrates that there are many short duration segments consisting typically of single-word responses. Many of these short duration segments are less than 1 second. The median segment duration is 2.74 seconds while the average segment duration is 3.75 seconds. Overlap between customer and representative segments can also be found. In this example, the customer representatives are all female and all but one of the customers is also female.

One goal of the experimental evaluation is to determine how well the speaker segmentation process described herein can detect the speaker segments or turns in the sample conversations of this exemplary experimental database. Two sets of measurements are used. The first set of measurements is associated with segment detectability, measuring the fraction of actual segments correctly detected and labeled.

If an actual segment is overlapped by an estimated segment by at least a fraction pdet≧0.5, then it is counted as either a hit or a confusion. If an actual segment does not count as either a hit or a confusion, then it is considered a miss. If the total number of actual segments is nsgs, and the total number of hits, confusions, and misses is nhit, ncnf, and nmis, respectively, then nsgs=nhit+ncnf+nmis. The segment miss and confusion rates, $psg_{mis}$ and $psg_{cnf}$, are defined as nmis/nsgs and ncnf/nsgs, respectively. Which segmentation and model corresponds with which speaker is not known beforehand. To determine whether a segment is "correctly" detected, the mapping between models and speakers which maximizes the hit rate is selected.

It is also possible for an estimated segment to overlap no actual segment from either speaker. This counts as a false alarm. This occurs rarely in our sample conversations since, after energy thresholding, there are few signal portions not generated by one or the other speaker. The number of false alarms defined in this way is negligible in our evaluation and is not discussed.

The second set of measurements specifies how close the detected segment durations are to actual segment durations. Let $dur_{act}$ be the total number of frames in actual speaker segments in the sample. Let $dur_{hit}$ and $dur_{cnf}$ be the total number of actual frames that overlap estimated frames correctly and incorrectly, respectively. Then the frame hit rate and frame confusion rates are given by $pfr_{hit}=dur_{hit}/dur_{act}$ and $pfr_{cnf}=dur_{cnf}/dur_{act}$, respectively. The frame miss rate is given by $pfr_{mis}=1-pfr_{hit}-pfr_{cnf}$.

Other useful measurements to examine the performance of the clustering procedure are also defined. Let ovlap(sega, segb) be the duration of the overlap between segmentations a and b, and dur(sega) be the total duration of the segmentation sega. Let act(j) and est(j) be the actual and estimated segmentations for speaker j in a conversation sample. The coverage for the segmentation estimate for speaker j, the contamination associated with speaker j by the segmentation for the other speaker j' in the sample, and the overlap between the two segmentation estimates are given by $$p_{cvrg}(j)=ovlap(act(j),est(j))/dur(act(j)) \quad (4)$$

$$p_{cntm}(j)=ovlap(act(j),est(j'))/dur(act(j)) \quad (5)$$

$$p_{ovlap}=ovlap(est(j'),est(j))/min(dur(est(j)), dur(est(j'))) \quad (6)$$

respectively.

Results

The results reported here examine performance of function of the following experimental variables: the minimum duration of segments to be detected (mindur), the threshold used in the GLR detection process to obtain an initial segmentation (lrthr), the segment detectability criterion (pdet), and the number of modeling/resegmentation iterations.

TABLE 1

| lrthr | average number of segments | average error rates (%) | | | |
|---|---|---|---|---|---|
| | | $psg_{mis}$ | $psg_{cnf}$ | $pft_{mis}$ | $pft_{cnf}$ |
| −0.25 | 42.9 | 18.9 | 7.8 | 14.6 | 2.6 |
| −0.30 | 42.9 | 18.4 | 6.1 | 13.8 | 2.6 |
| −0.35 | 43.7 | 16.2 | 8.2 | 13.3 | 2.7 |

Segment and frame error rates averaged over all samples are shown as a function lrthr in Table 1, above, with pdet set to 0.5. The error rates are moderately high with segment miss rates of the order of 15 to 20% and segment confusion rates of the order of 6 to 8%. Generally, the miss rates are expected to decrease and the confusion rates are expected to increase as the detection threshold is decreased. This occurs because both coverage and contamination should increase as the threshold is relaxed. In this example, however, at lrthr=−0.35, two samples fail because the two segmentations overlap significantly, indicating excessive contamination.

The duration miss rates are consistent with the segment miss rates but the duration confusion rates are significantly lower than the segment confusion rates. This is because most of the segment confusions are attributable to short segments which, because the process has limited resolution, are not reliably detected. This effect can be seen in the histogram 601 shown in FIG. 6, where the shaded area represents the number of segments which are missed or confused. Most such errors occur for segments with durations less than 2 seconds.

Table 2, shown below, shows more clearly the effect of segment duration on performance for segment miss and confusion rates. Each row in this table excludes actual segments whose duration is less than the specified value of mindur. It can be seen that the segment miss rate is reduced 4 to 1 for mindur equal to 1 second while the segment confusion rate is negligible at 0.3 percent.

TABLE 2

| mindur (seconds) | average number of segments | average error rates (%) | |
|---|---|---|---|
| | | $psg_{mis}$ | $psg_{cnf}$ |
| 0 | 42.9 | 18.4 | 6.1 |
| 1 | 31.4 | 4.5 | 0.3 |
| 2 | 26.3 | 4.3 | 0.0 |
| 3 | 19.6 | 2.5 | 0.0 |

Figure 7:
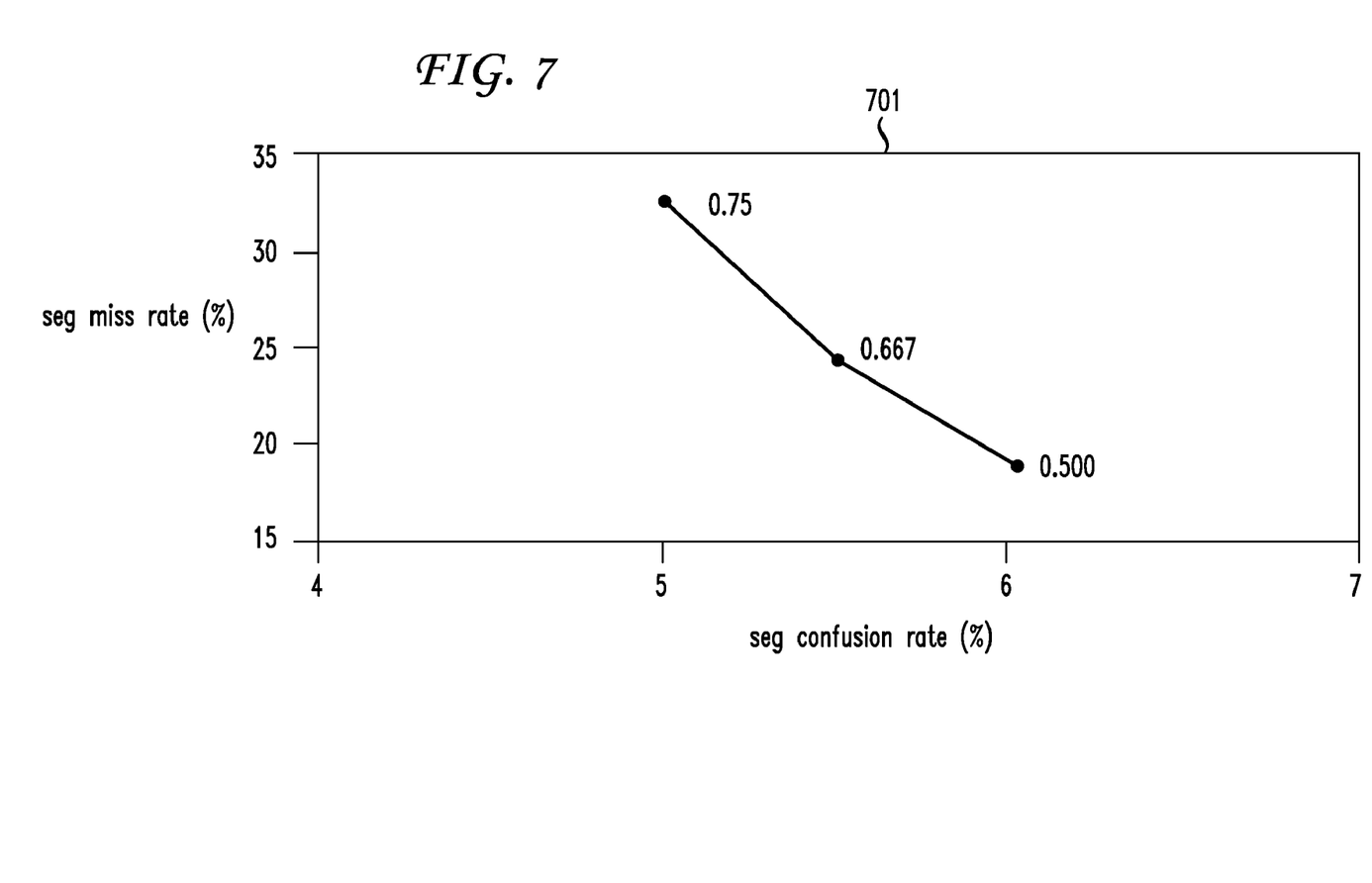
FIG. 7 plots a segment miss rate versus a segment confusion rate for three values of a segment detectability criterion.

Another variable of interest is the detectability criterion pdet. A plot of segment miss rate versus segment confusion rate for three values of pdet is shown as plot 701 in FIG. 7. As expected, the segment miss rate increases and the segment false alarm rate decreases as pdet increases.

Returning to Table 1 to examine the effect of varying lrthr, it can be seen that the higher value of lrthr is associated with worse miss rates but better confusion rates than is the lower value. With a higher value of lrthr, fewer segments are estimated in the initial segmentation so that coverage is reduced, but these segments are less likely to be contaminated. A contaminated estimated segment is one in which a speaker boundary occurs within the estimated segment.

Figure 8:
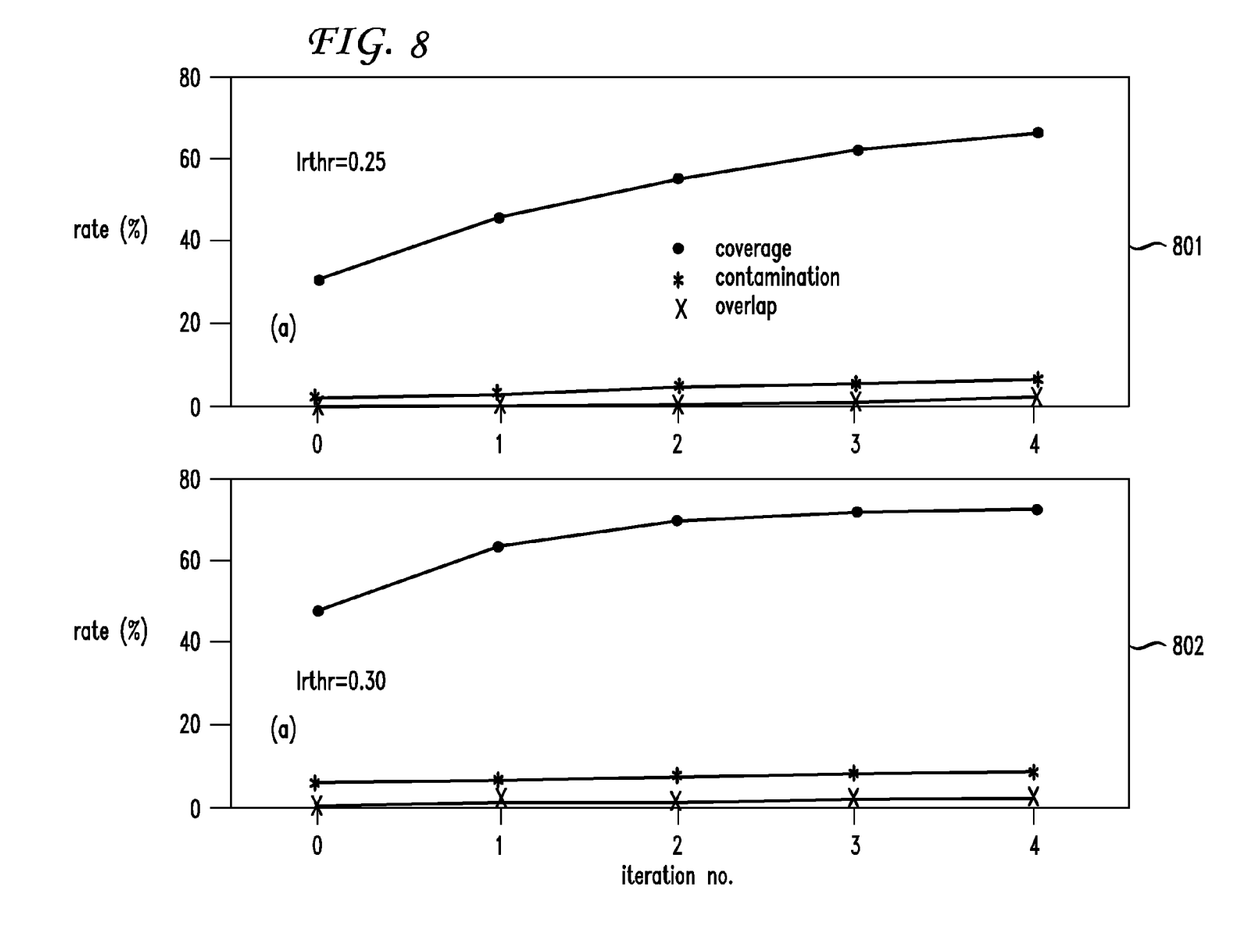
FIG. 8 illustrates clustering performance in terms of coverage, contamination, and overlap for two different thresholds used in a generalized likelihood ratio (GLR) detection process to obtain an initial segmentation.

These effects can be seen more clearly by examining clustering performance in terms of the measurements previously discussed. FIG. 8 shows clustering performance for the same two values of lrthr examined in Table 1 as a function of segmentation/modeling iteration. The plot 801 illustrates the clustering performance in terms of coverage, contamination and overlap for lrthr=−0.25 and the plot 802 illustrates the clustering performance in terms of coverage, contamination, and overlap for lrthr=−0.30. Clustering performance, in terms of coverage $P_{cvrg}$, contamination $P_{cntm}$, and overlap $P_{ovlap}$, are averaged over all samples and speakers.

Iteration number 0 refers to the initial segmentation while iteration numbers greater than 0 refer to successive modeling and resegmentation stages. It can be seen that all three measurements increase monotonically through successive iterations. The lower value of lrthr is associated with a higher maximum coverage and faster convergence to the value of maximum coverage than higher values of lrthr at the expense of a somewhat higher value of contamination. Overlap, an a priori measurement, is seen to be a reasonable predictor of contamination. Note that the maximum values of coverage, approximately 67% for lrthr=−0.25 and 72% for lrthr=−0.30, are consistent with the segment miss rates for the same values of lrthr shown in Table 1.

The current performance obtained is useful, for example, to provide some automated assistance to human labelers to locate the longest segments originating from the customer in a customer/representative telephone conversation. The ability to segment speakers accurately increases for longer segment durations and the segments do not need to be located with great precision, so that a detectability criterion of pdet=0.5 is adequate.

Speaker change detection can also be achieved using Bayesian Information Criterion. Also, adding such speaker-specific features as pitch might enhance the ability to detect speaker changes. In addition, it may be possible to create improved models for the customer representative speakers if they are present in more than one conversation.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A system for segmenting multi-speaker speech data by speaker, the system comprising:
   a processor;
   a first module configured to control the processor to check whether segments in a first group of estimated segments overlap segments in a second group of estimated segments, wherein if segments of the first group overlap with segments of the second group, then pooling the first group and the second group; and
   a second module configured to control the processor to model and resegment any pooled groups and remaining groups of estimated segments to obtain stable segmentations.

2. The system of claim 1, further comprising:
   a third module configured to control the processor to detect speaker changes in multi-speaker speech data to obtain an initial segmentation of the multi-speaker speech data, wherein estimated segments are generated by the detected speaker changes; and
   a fourth module configured to control the processor to cluster the estimated segments into groups of estimated segments, wherein each group of estimated segments is associated with a single speaker.

3. A system of claim 2, wherein the third module further performs a front-end analysis on the multi-speaker speech data.

4. A system of claim 2, wherein the third module further performs at least one of:
   detecting speaker changes using Bayes Information Criterion; and
   detecting speaker changes using a generalized likelihood ratio formulation, wherein a speaker change occurs when the generalized likelihood ratio formulation exhibits a dip.

5. A system of claim 2, wherein the fourth module further applies an agglomerative hierarchical clustering procedure to obtain an initial grouping of segments.

6. A system of claim 2, wherein the fourth module further clusters the estimated segments into groups of estimated segments until all of the estimated segments are merged into a final group, wherein the final group includes one or more clusters that correspond to the groups of estimated segments and wherein each cluster corresponds to a single speaker.

7. A system of claim 6, wherein the fourth module further identifies the one or more clusters in the final group empirically.

8. A system as defined in claim 2, wherein each estimated segment is initially in a separate group of estimated segments, wherein the fourth module further:
   models each estimated segment by a low-order Gaussian mixture model;
   generates table of pairwise distances using the low-order Gaussian mixture models, wherein the table of pairwise distances includes a distance between each estimated segment and every other estimated segment; and
   merges at least two groups of estimated segments to produce a new group of estimated segments such that a merger of the at least two groups of estimated segments produces a smallest increase in the distance.

9. A system as defined in claim 8, further comprising a fifth module configured to merge new groups of estimated segments until all estimated segments are merged into a final group.

10. A system of claim 8, wherein modeling and resegmenting each group of estimated segments to obtain stable segmentations further comprises:
    constructing a Gaussian mixture model for each group of estimated segments; and
    calculating a frame-by-frame likelihood ratio detection score for each Gaussian mixture model compared with a Gaussian mixture model representing the multi-speaker speech data.

11. A system of claim 1, wherein the third module further estimates speaker segments by detecting dips in the generalized likelihood ratio formulation.

12. A system of claim 1, wherein the third module further estimates speaker segments when the generalized likelihood ratio formulation remains above a specified threshold for a particular duration.

13. A system of claim 1, wherein the third module further determines a location of a boundary between speaker segments by calculating the generalized likelihood ratio formulation over successive overlapping windows throughout the multi-speaker speech data.

14. A system of claim 1, wherein the first module further:
    pools the estimated segments that overlap; and
    models and resegments the estimated segments that overlap.

15. A system of claim 1, further comprising a third module configured to perform post-processing on the speaker segments by creating a segmentation lattice, wherein a best path through the segmentation lattice is a sequence of non-overlapping estimated segments such that an overall segmentation likelihood is maximized.

16. A system of claim 1, further comprising a third module configured to obtain a final segmentation by:
    comparing detection scores of each group of estimated segments;
    hypothesizing segment boundaries when a difference between detection scores crosses zero; and
    accepting segments defined by the hypothesized segment boundaries if each segment has a duration above a duration threshold and if each segment does not cross a silence gap that is longer than a gap threshold.

17. A system of claim 1, wherein the speech data is one of a telephone conversation between two or more speakers, an archived recorded broadcast news program and a recorded meeting between multiple speakers.

18. A system for segmenting speech data into speaker segments by speaker, the system comprising:
    a processor;
    a first module configure to control the processor to scan input speech data with a windowed generalized likelihood ratio (GLR) function to obtain speech segments, wherein the input speech data includes a plurality of speakers;
    a second module configured to control the processor to cluster the speech segments into one or more clusters, wherein each cluster is associated with a single speaker;
    a third module configured to control the processor, if more clusters exist than speakers, to:
       check overlap between segments in each cluster;
       pool clusters that have overlap between at least one segment in each pooled cluster; and
       resegment and remodel the pooled clusters;
    a fourth module configured to control the processor to create models for each cluster; and
    a fifth module configured to control the processor to rescan the input speech data with the models to resegment the speech data and obtain speech segments for each speaker included in the speech data.

19. A system of claim 18, wherein the first module further performs a front-end analysis on the input speech sample.

20. A system for segmenting speech data by speaker, the system comprising:
    a processor;
    a first module configured to control the processor to obtain initial estimated segments of the speech data, wherein the estimated segments are unlabeled;
    a second module configured to control the processor to cluster the initial estimated segments until the initial estimated segments are grouped into a final group;
    a third module configured to control the processor to select one or more clusters from the final group, wherein one or more clusters corresponds to groups of estimated segments;
    a fourth module configured to control the processor to iteratively model and resegment each group of estimated segments until changes in segment boundaries for the estimated segments in each group of estimated segments from a particular iteration to a next iteration are below a threshold;
    a fifth module configured to control the processor, if at least one segment in a first group of estimated segments overlaps with at least one segment in a second group of estimated segments, to pool the first group and the second group of estimated segments;
    a sixth module configured to control the processor to iteratively model and resegment the pooled first and second group and any remaining groups of estimated segments to generate new groups of estimated segments until the overlap between the new groups of estimated segments is below a particular level; and
    a seventh module configured to control the processor to associate each group of estimated segments and each new group of estimated segments, if any, with a different speaker.

* * * * *